MAGNETIC SOUND RECORDING DEVICE

Filed Sept. 24, 1956 3 Sheets-Sheet 1

Inventors:
Siegmund Loewe
Werner Horn

July 5, 1960 S. LOEWE ET AL 2,943,804

MAGNETIC SOUND RECORDING DEVICE

Filed Sept. 24, 1956 3 Sheets-Sheet 2

Inventors:
Siegmund Loewe
Werner Zorn

July 5, 1960 S. LOEWE ET AL 2,943,804

MAGNETIC SOUND RECORDING DEVICE

Filed Sept. 24, 1956 3 Sheets-Sheet 3

Inventors:
Siegmund Loewe
Werner Zorn

United States Patent Office 2,943,804

Patented July 5, 1960

2,943,804

MAGNETIC SOUND RECORDING DEVICE

Siegmund Loewe, 68 Ridge Road, Yonkers 5, N.Y., and Werner Zorn, Schillerstrasse 5, Berlin-Zehlendorf-West, Germany Filed Sept. 24, 1956, Ser. No. 611,792

Claims priority, application Germany Sept. 28, 1955

2 Claims. (Cl. 242—55.12)

The invention concerns magnetic sound recording devices and aims at solving a problem which often occurs with magnetic sound recordings. Magnetic sound recorders are often used to perform various recordings, e.g. radio programmes, on magnetic recording tapes in order to be always able to repeat especially interesting recitals, lectures or similar programs. Here, the usual procedure is to record several recordings as desired one after the other on the magnetic tape.

If now, for example, a complete musical recital has just been recorded on the magnetic tape, it is probably desired to record a new recital on the tape following this programme or recording. Thus, in the case of a radio programme, the magnetic sound recorder will be used and the announced radio programme will be listened to and, at the same time, recorded on the magnetic tape. It may happen that this new radio programme does not please the listener and must, therefore, be erased from the magnetic tape. In this case, the magnetic tape must then be rewound and the part of the unsuitable programme recorded can thereby be erased.

Here the difficulty now arises in that only this final recording is to be erased and of avoiding inadvertent inclusion of the earlier recording, already made on the magnetic tape before the recording now to be erased, so that this is not erased or played over by a new recording.

This problem is now solved by the invention. The device, in accordance with the invention, provides means permitting the erasing and running back of the tape, as desired, to the commencement or termination of a previously recorded tape recording which is to be retained or, in general, the finding of any point on the magnetic tape as desired in any direction, also, in particular with dual-track magnetic recording tapes, the automatic return from the second track to the first track, and as desired also the erasing of the recording.

In carrying out the idea of this invention, a preferably single control device, e.g. control lever is used which effects the essential control operations of the magnetic tape recorder in positive dependence on the movements of the control lever and is connected with a, for example, clock-shaped indicating device, the pointer of which always indicates which part of the tape is just lying before the magnetic head.

Further details of the device in accordance with the invention are given on the basis of the diagrams in the accompanying drawings which show examples of the invention.

Figures 1, 2:
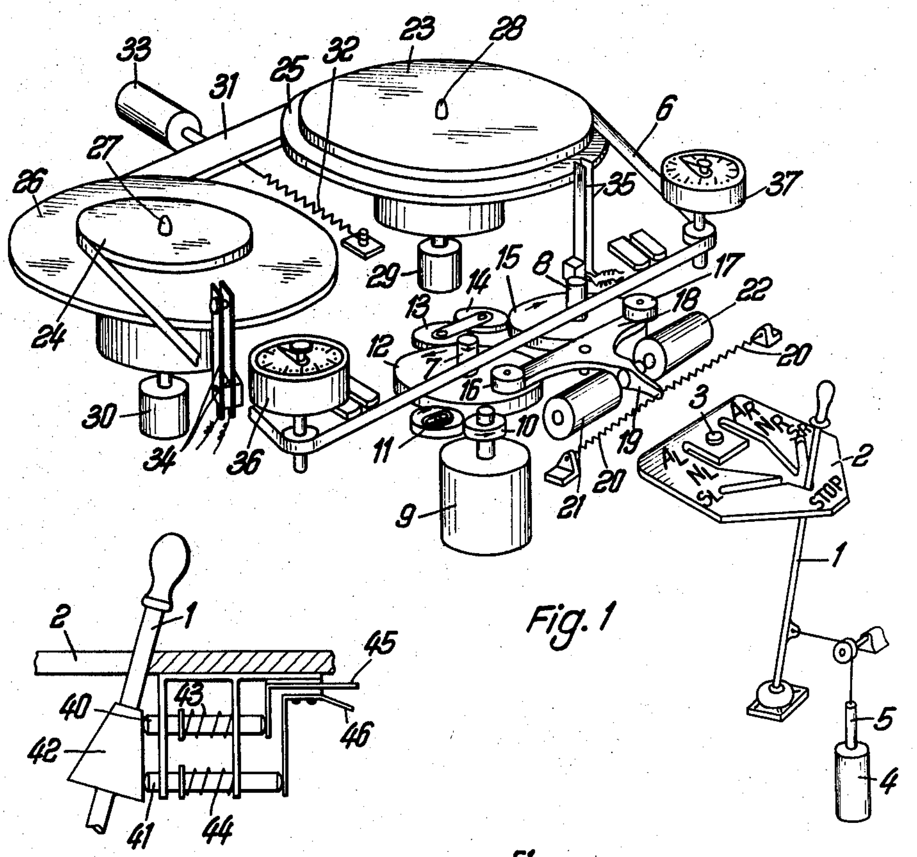
Fig. 1 is a schematic and perspective view of the most important operating elements of the magnetic sound recorder together with the control lever for operating the recorder.
Fig. 2 is a view partly in section of the control lever and electrical contact device associated therewith.

In Fig. 1, 1 is the control lever and 2 the control plate which is provided with slots or guides for the control lever which determine the control movements of this lever 1 so as to avoid faulty control. 3 is a button for operating the reverse motion of the tape at high speed. 4 is an electro-magnet which effects the electrical release of the control lever 1 from one of its operational positions by control of the appertaining core 5. The drive of the tape 6 is made by means of the two separate drive capstans 7 and 8, rotating in opposite directions. The motor 9 drives the flywheel 12 via the friction wheels 10 and 11 and thereby also the drive capstans 7 and further the other flywheel 15 via the reversing friction pulleys 13, 14 and thereby the drive capstans 8 in contra-rotating directions. Instead of a swivel pressure roller, a device is chosen in the present example which has two pressure rollers 16, 17 fastened to a swivel holder 18 in such a way that, when this holder 18 is swivelled, alternately one of the two pressure rollers 16 or 17 is brought into contact with the appertaining drive capstan 7 or 8, whereby the tape is pressed against the sound pulley and is driven in one of the two running directions of the tape, whichever is desired. A magnetizable tongue on this holder 18 which is kept in a central position by springs 20 can be swivelled to one side or the other by magnetization of the electro-magnets 21, 22. By means of this, one of the two pressure rollers 16, 17 will be operative and the tape driven in one of the two directions of movement.

The tape reels 23 and 24 lie on the friction discs 25, 26 which belong to the elements of the friction drive lying below. The axles 27 and 28 of these reels or friction discs are pulled downwards by the electro-magnets 29, 30, when the magnetizing current is passed through the electromagnets, and thereby effect, in an electromagnetic manner, the increase in friction between friction disc and appertaining drive disc—which may be below the friction discs 25 and 26—necessary for causing high speed running.

Reference numeral 31 designates a braking shoe which is pulled against the friction discs 25, 26 by means of the spring 32 when the magnetizing current does not flow through the appertaining electromagnet 33. Thus, in this case, when the electro-magnets are without current, the brake shoe 31 is in contact with the friction discs and thereby effects a stoppage of the friction discs and the tape.

The contact springs 34, 35 are co-ordinated with the two tape rolls 23, 24 and are operated by the tape whenever the appertaining tape roll is completely wound off. By means of this, an automatic stoppage of the drive and tape results as soon as the tape roll is completely wound off. 36, 37 are two preferably clock-shaped indicating devices, provided in accordance with the present invention, from which the actual length of tape wound off and thus the respective position of the tape in front of the magnetic head can be read off. These indicating devices are explained in more detail by means of the following diagrams.

The position of the control lever 1 shown is the position at rest (STOP). If the control lever 1 is brought into one of the positions marked, the recorder is operated in one of the various kinds of operation. Supposing that the control lever 1 is brought into position $N_L$, i.e. the recorder is to be put into normal speed to the left, then, in this control position, the electro-magnet 22 is activated, thereby the holder 18 swivelled so that the pressure roller 17 presses the tape 6 against the drive capstan 8. Thus, the tape is driven from the right to the left at normal speed.

At high speed motion-control lever 1 being in position $S_L$—the holder 18 with the driving capstans will not be swivelled but remains, owing to the simultaneous action of the two springs 20, in the position shown in Diagram 1, i.e. neither of the driving capstans 7, 8 is in contact with tape 6, the tape itself, too, not being in contact with the driving capstans. The electro-magnet 30, however, has attracted the axle 27 whereby the friction between the friction disc 26 and the driving disc below is considerably increased. Thus, the tape will be moved from right to left at high speed.

By switching-in the electro-magnet 4 and thus by attraction of the magnet 5, the control lever 1 is brought back, in case of need, from one of the will operate positions to the stop position.

Fig. 2 schematically shows the operation of the switch contacts 40, 41 by the connecting piece 42 on the control lever 1. 43 and 44 are springs which, in every case, exert a spring pressure on the switch contacts so as to guarantee a reliable contact. The appertaining electrical circuits are joined to the soldering tabs 45, 46.

Figure 3:
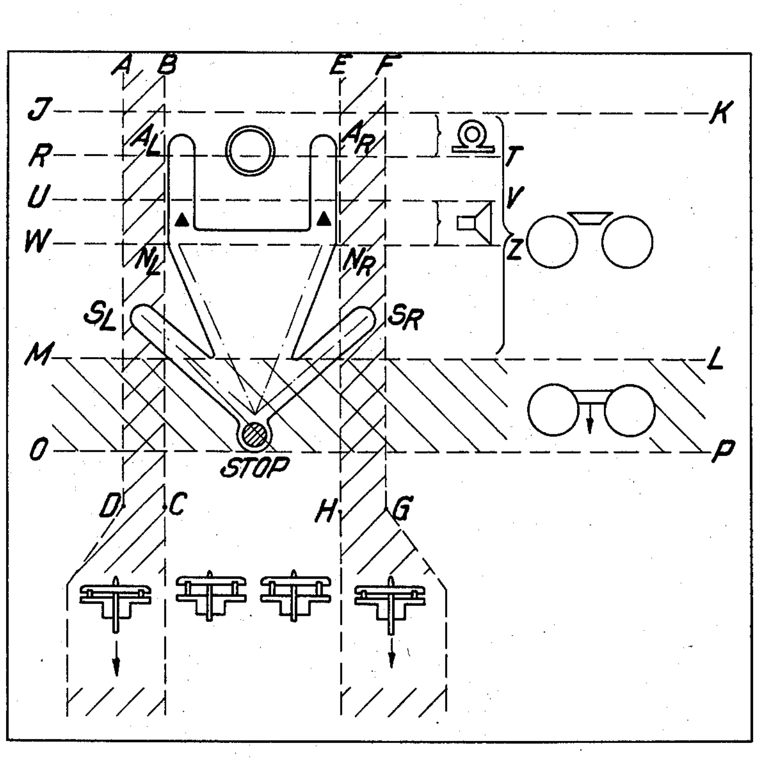
Fig. 3 is a schematic view showing the various control operations.

Fig. 3 provides a clear survey of the various control operations of the control lever 1. If this control lever is in the area MLOP, the magnetic sound recorder is always stopped. This stop position is marked by the symbol on the right hand side within this strip MLOP. As soon as the control lever is brought into the area marked out by the lines IK and ML, the brake shoe is lifted from the friction discs so that the magnetic sound recorder will operate. Thus, all the operational positions are in this area, being:

| | |
|---|---|
| $S_L$=high speed left | $S_R$=high speed right |
| $N_L$=normal speed left | $N_R$=normal speed right |
| $A_L$=recording left | $A_R$=recording right |

By means of the line WZ, the area of high speed on movement of the control lever is given a top limit. The area which next comes, commencing with the line WZ and limited by the line UV, represents the area of reproduction. The recording area begins with the line RT and ends with the line IK.

By means of the four lower symbols for the condition of the friction coupling (see also Fig. 3), the respective operational condition of this friction coupling for the reel discs is symbolized. The two outer symbols mean that the friction of the coupling has been considerably increased. The increase in friction occurs in the area of high speed which is limited by the lines AD and BC, on the one hand and the lines EH and FG, on the other hand. The two centre symbols for the friction coupling mean that the friction has not been altered with respect to the normal position. This area is limited by the vertical lines BC and EH. In this area are the control positions for normal speed reproduction and recording, designated by the symbols at the right in the upper part of this figure.

The diagrams, as given up to now, refer only to the electrical switching operations of the magnetic sound recorder which is to be used in connection with the present invention.

Figure 4:
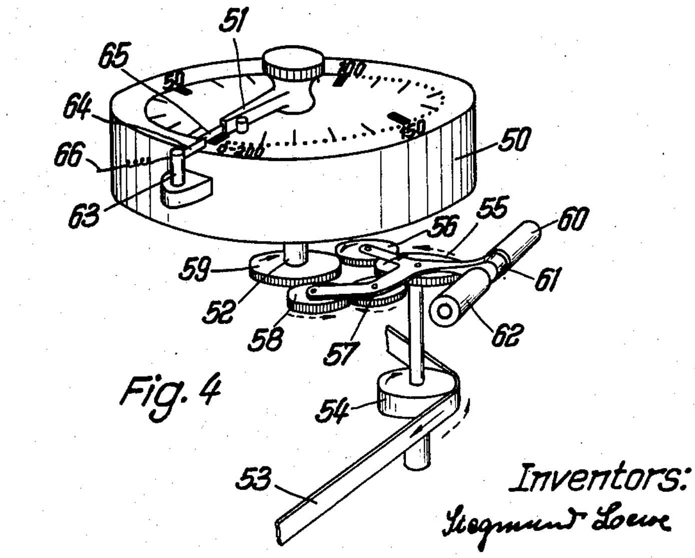
Fig. 4 is a perspective view of the indicating device, used in connection with the magnetic sound recorder, with the appertaining drive elements.
Figure 5:
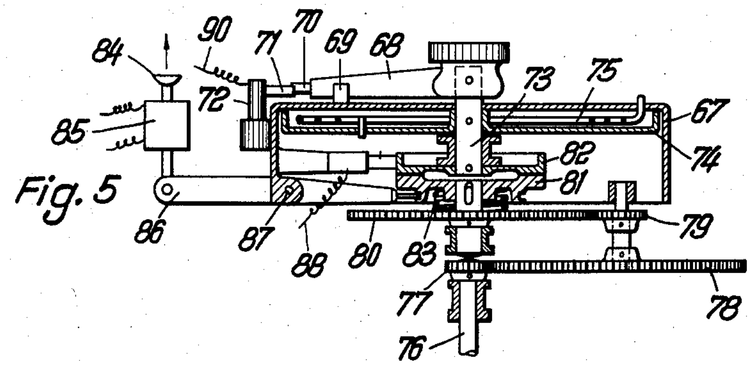
Fig. 5 is a view partially in section of another form of the indicating device.
Figure 6:
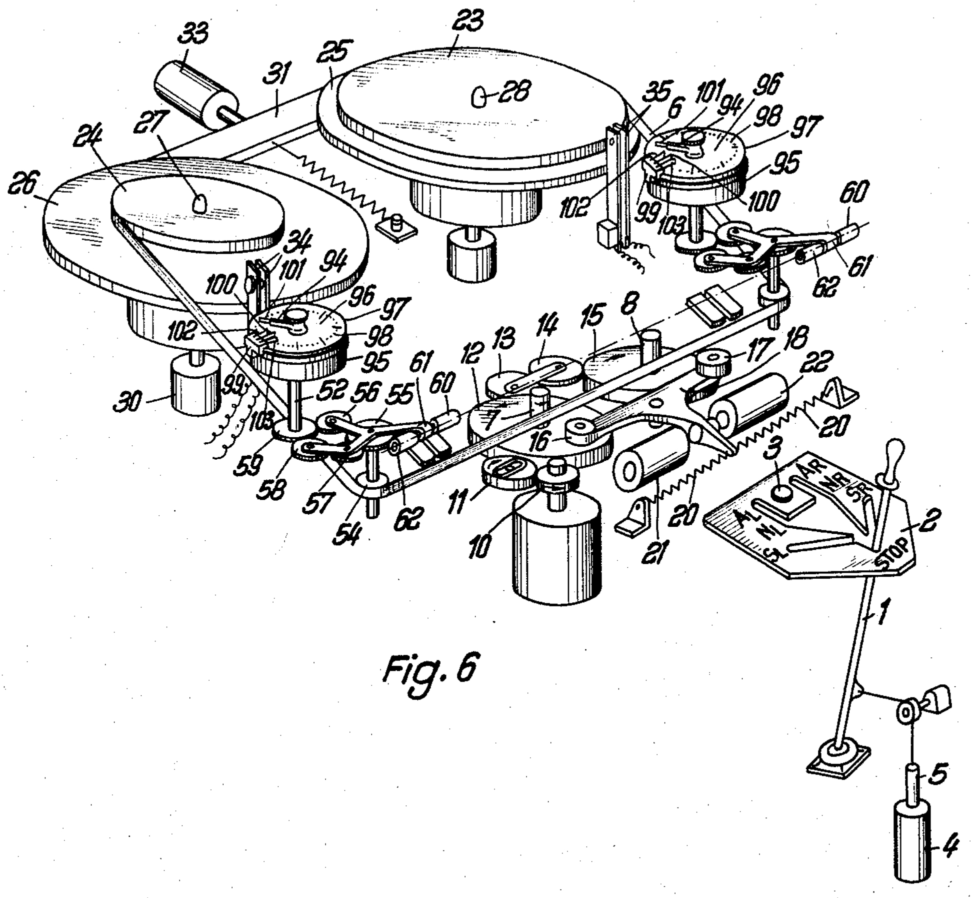
Fig. 6 is a perspective view of a further example of the indicating device.

A further important operative element in connection with the present invention is the indicating device, shaped, for example, in the form of a clock, which is represented in the remaining Figures 4–6 in various examples.

Fig. 4 shows the indicating device 50 with the pointer 51. This pointer 51 is driven, via the axle 52, by the roller 54 set in motion by the tape 53 by means of the interposition of intermediate wheels 55, 56, and 57, 58. If, for example, a dual-track tape is used in which the first track is scanned in one direction and the second track in the opposite direction, then, when scanning the first track, the drive of the pointer 51 of the indicating device 50 is made via the friction discs 55, 56 and 59 on the axle 52. If, for example, the first track is 100 m. long, then, on scanning this track, the indicating device shows by means of the pointer 51 values up to 100. For this operating position, the electro-magnet 60 is operated which pulls the lever 61 with the intermediate wheels to the right. Thus, the friction disc 56, is, as already described, in mesh with the wheels 55 and 59.

If the magnetic sound recorder is now switched over to the second track, the reversal of the direction of the tape movement results. So that the pointer will now show the further 100 m. of the second track on the dial of the indicating device in the same direction, an additional intermediate wheel is switched in. This is effected by automatic operation of the electro-magnet 62, coming into effect at the end of the tape, so that the magnet pulls the lever 61 with the intermediate wheels to the left thereby effecting the drive of the pointer mechanism of the indicating device 50, this time via the friction discs 55, 57, 58, 59 on the axle 52. Thus, the pointer 51 moves in the same direction as before although the running direction of the recording tape has now been reversed.

This indicating device, shown in Fig. 4, can now be used to read off at any time the operating position of the tape and, in the case of useless or undesirable recordings, to erase these and to use the tape again.

Let it be supposed that, at first, a desirable recording has been made on the tape up to position 70. If now from this value a new recording is made on the tape following this and it then turns out that this recital is of no value, then this new recording, just made, must be erased back to value 70 and played over again. Thus, the control lever 1 is now switched to one of the two high speed positions (see Fig. 1). The tape is thus returned to value 70 and, also at the same time, the pointer 51 and, at this value, the control lever 1 must be put in the stop position. In this way, it is, therefore, possible to erase at any time any portions of the tape and use them for further recording or to leave them as they are, as is desired.

On the other hand, the pointer 51 can also be used as a spot indicator. In this case, after every successful and satisfactory recording, the contact 63, 64 is moved by hand to the spot shown by the spot indicator. This is always done at the finish of every recital which is to be retained. Whenever the recording of a recital is commenced and is not to be retained, the pointer 51 is brought back at high speed to the respective position of the contact 64 and the movement of the tape is brought to a stop there.

The electrical contact carrier 63, shown in Fig. 4, with the contact springs 64 (fastened to the contact) and 65 (fastened to the pointer 51) serves to stop the recorder. The electrical circuit for stopping the recorder is then closed via the pointer, on the one hand, and via the lead 66, on the other hand.

The device up to now described can be still further improved as follows:

In Fig. 5, a section through a further development of this indicating device is shown. The casing of the indicating device is marked with 67. 68 is the pointer. 70 and 71 are the two electrical contacts between the pointer 68 and insulated contact carrier 72. The axle of the pointer is designated with 73. On this axle, a disc 74 is fixed. A spiral spring 75 is provided between this disc 74 and the casing 67 and this spring effects the automatic return of the pointer 68 to zero position on release of the pointer mechanism. The drive from the tape is effected via the axle 76 and the reduction gears 77, 78, 79, 80 and the friction coupling 81, 82. The spring 83 provides for the contact of the friction disc 81 with the counter-disc 82 of the friction coupling. By pulling the handle 84 or by operation of the electro-magnet 85, the friction disc 81 is shifted downwards against the pressure of the spring 83 by the lever 86 which can be swivelled around the pivot 87 and, in case of need, this can be done to set back the pointer since thereby the pointer mechanism is released and the pointer can be put back to the zero position by the pressure of its spring 75. When in the zero position, the electrical contact circuit 70, 71 is closed and the magnetic recorder is stopped. The electrical circuit is conducted from the lead 88 via brushes 89, friction disc 82, axle 73, pointer 68, contacts 70, 71 to the lead 90, thus closing the circuit for stopping the magnetic recorder, this circuit being connected with the energizing source.

Using this indicating device, it is not necessary to read off the respective recording length on the tape. If it is desired to retain the recording, the indicating device is released by hand or by electro-magnetic means, so that the point springs back to zero.

This should not affect the making of contact. A contact, which immediately stops the recorder in an electrical manner, should, on the other hand, be made if the pointer is not put back but if the tape is allowed to run back at high or normal speed and if it is intended to make a new recording.

The mechanical method for arranging the contacts 70, 71 so as not to make contact when the pointer springs back to zero and to make contact when the tape runs back is as follows: The movement of the pointer 68 is stopped by a spring 69 which maintains, at the zero position of the pointer, a small distance between the contacts 70, 71 against the pressure of the spring 75. If, on the other hand, the pointer returns to the zero position by means of the reduction gears and the coupling 81, 82 at the same time as the tape reverses the direction of its movement, then this results with sufficiently strong pressure to bend the spring 69 so far that the contact between 70, 71 is closed. (High pressure contact.)

Instead of contact-making at the zero position of the pointer, it is possible, when employing a shift contact, to use the described mechanism also for automatically stopping or continuing the running of the recorder. The shift contact together with the spring 69 then fastened to it is adjusted each time to the end spot of the last tape recording desired. If now it is desired to erase an unsuitable recording, just begun, and to replace it by a new one, the pointer and tape are allowed to run back and the stopping of the recorder results automatically by means of the adjusted contact as soon as the end of the last tape recording is reached; otherwise, if this is not desired, the pointer is allowed to spring back. The recorder then remains ready to record a new recital following the previous tape recording.

A further example in which the high pressure shift contact, referred to, can also be used is represented in Fig. 6. Herein the elements numbered 1 to 35 are the same as shown in Fig. 1. The elements numbered 52 to 62 are the same as shown in Fig. 4. Additionally, the tape 91, on movement, drives the axle 93 of the pointer 94 of the indicating device 95 via the roller 92. The pointer moves over a scale 96 from which the various recording lengths can be read off. The first sound track on the tape of, for example, 100 m. track length can be read off from the outer scale 97 with the indication values 0–100 while the played length of the second sound track of the dual-track tape can be read off on the inner scale 98 also with the values 100–0 going backwards, that is with backward movement of the pointer corresponding to the tape movement on scanning of the second sound track. It is possible, for example, by means of various coloured lighting to make the scale range which is then valid recognizable on the outside. The direction of the pointer 94, therefore, always corresponds to the direction of the tape movement, and its position corresponds to the tape spot which is then opposite the magnetic heads.

Figure 7:
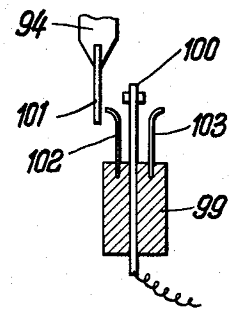
Fig. 7 is a view partially in section of the double-sided contact in accordance with the invention.

The contact piece 99 can, as has already been mentioned above, be made movable along the edge of the scale so that it marks the end of the last tape recording or the commencement of a new. If it is desired to retain a recording, then the contact assembly 100, 102, and 103 formed in both directions of the pointer movement as to operate as high pressure contact, is moved to the end of this recording. If it is desired to replace it by another, the contact is left where it is and the pointer is moved by the shortest way, preferably at high speed, to the place of the contacts 100, 102, and 103 and stops the tape running there by operation of the high pressure contact, changing over to the other track, as the case may be. An example of such a double-sided high pressure contact is shown in Fig. 7. In the contact carrier 99, the contact spring 100 is retained securely. Should the contact 101 fixed on the pointer 94 approach from the right or the left the contact 100, then it thrusts first against the repelling guard springs 102 or 103 which require a definite increase in pressure compared to that which occurs by the mere approach of the contact carrier 99 to the position of the pointer before they give way and permit the making of contact which stops the running of the tape.

However, as soon as the pointer in its reverse motion caused by the tape movement reaches this spot, then contact is made between the contacts 100 and 101, thus stopping the tape recorder.

Returning to Fig. 1, it is to be mentioned that, in this diagram, two indicating devices 36 and 37 are represented. 36 is the device equipped with two scales arranged coaxially, whilst 37 is a continuous scale for the two sound tracks. In practice, one of these indicating devices is, in general, sufficient.

Finally, it is to be added that the indicating device can, for example, be also formed as a preferably endless tape, running via drive rollers, on which a scale graduation is arranged. It is also possible for a roller or cylinder to act as indicating device on the surface of which the graduations are affixed.

What we claim is:

1. A magnetic sound recording device of the type having a pair of reels for the winding and storage thereon of a tape on which sound impulses may be impressed, and comprising driving means for rotating said reels and thereby moving said tape, an indicating device driven by the tape including a dial and a pointer for indicating at any time the length of said tape run-off, coupling means between said pointer and said driving means, a contact device shiftably and selectively adjustably arranged on said indicating device and, when contacting the pointer of said device, performing a control of said driving means, said contact device consisting of a main spring contact and two repelling guard springs each arranged at either side of said main spring contact, said two repelling guard springs being so dimensioned with reference to their spring force as to be adapted for giving contact between said pointer and said main spring contact only when said pointer is driven from the tape movement by means of said coupling means.

2. A magnetic sound recording device of the type having a pair of reels for the winding and storage thereon of a tape on which sound impulses may be impressed, and comprising driving means for rotating said reels and thereby moving said tape, an indicating device driven by the tape including a dial and a pointer for indicating at any time the length of said tape run off, coupling means between said pointer and said driving means, a contact device shiftably and selectively adjustably arranged on said indicating device and, when contacting the pointer of said device, performing a control of said driving means, a release device for mechanically interrupting said coupling means between said pointer and said driving means moving the tape, and for moving back said pointer to said contact device, said contact device consisting of a main spring contact and two repelling guard springs each arranged at either side of said main spring contact, said release device containing a spiral spring for moving back said pointer when said coupling means between said pointer and said driving means are interrupted, the force of said spiral spring being so dimensioned as to be adapted not to overcome the spring force of said repelling guard springs of said contact device, thus preventing said pointer from giving contact with said main spring contact.

References Cited in the file of this patent

UNITED STATES PATENTS 2,335,277 Heller ---------------- Nov. 30, 1943
2,756,279 Lang ------------------ July 24, 1956